Oct. 6, 1936. J. W. ANDERSON 2,056,554
METHOD OF ATTACHING SPOKES TO STEERING WHEEL HUBS
Original Filed Sept. 9, 1935
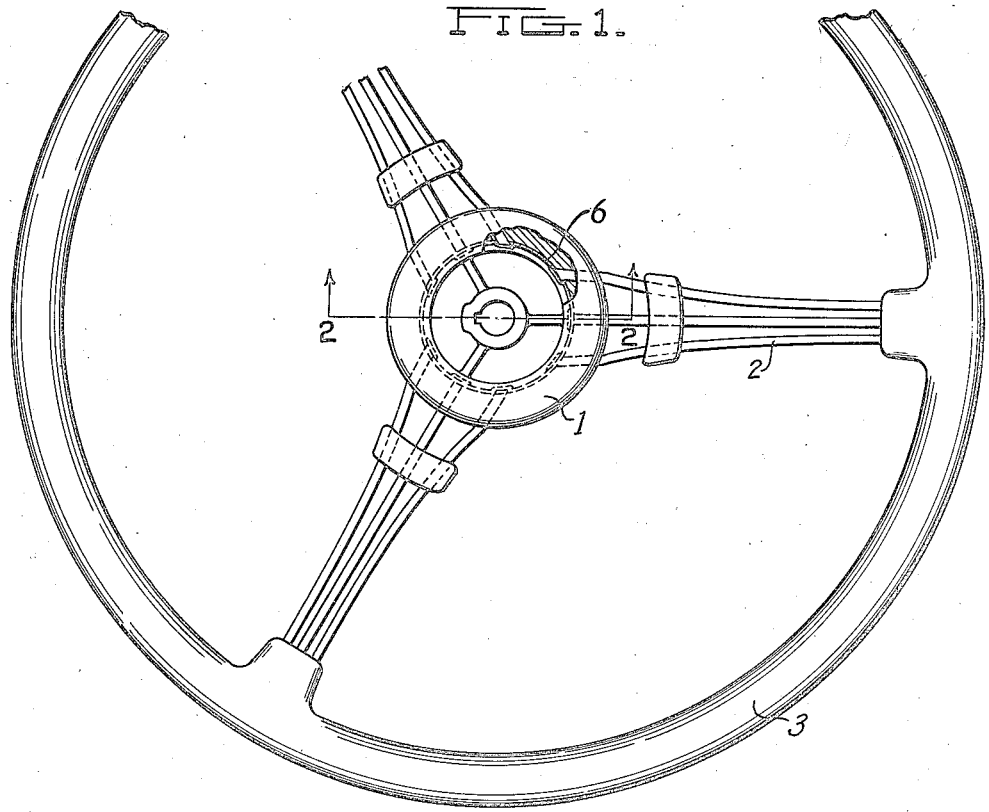
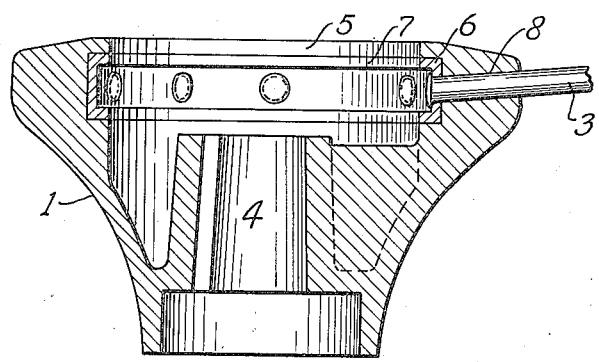
Inventor
John W. Anderson,
By Owen & Owen,
Attorneys.

Patented Oct. 6, 1936

2,056,554

UNITED STATES PATENT OFFICE 2,056,554

METHOD OF ATTACHING SPOKES TO STEERING WHEEL HUBS

John W. Anderson, Portland, Ind., assignor to Sheller Manufacturing Corporation, Portland, Ind., a corporation of Indiana Original application September 9, 1935, Serial No. 39,681. Divided and this application April 29, 1936, Serial No. 76,911

2 Claims. (Cl. 29—159.3)

This invention relates to steering wheels of the type particularly used in automobiles, and has primarily for its object the provision of a method of attaching the wire spoke ends to the hub members of such wheels.

In wheels of this character, it is customary to make the hubs in two parts, a lower body part and an upper spoke clamping part secured to the body part by screws or the like. There are certain objections to this form of hub construction and manner of attaching the wire spoke ends thereto which it is the purpose of the present invention to overcome.

This is a division of application Serial No. 39,681, filed September 9, 1935.

The invention is fully described in the following specification and a preferred embodiment thereof illustrated in the accompanying drawing, in which—

Figure 1 is a plan view of a steering wheel embodying my invention, with parts broken away, and Fig. 2 is an enlarged section on the line 2—2 in Fig. 1.

Referring to the drawing, 1 designates the hub, 2 the wire spoke members, and 3 the rim of a hand steering wheel.

The hub 1 is composed of a single piece of hard rigid material, preferably die cast metal, and is provided centrally with the steering post and key-receiving opening 4, the lower or bottom end of which is enlarged to receive the customary steering post column. The upper end of the hub at the top of the opening 4 is provided with an enlarged coaxially disposed socket 5 for receiving the control parts and mounting therefor customarily provided on steering wheel hubs.

The side wall of the socket 5 is cylindrical or substantially so, and set into an undercut annular recess 6 therein is a metal ring 7 preferably of steel, which is U-shaped in cross-section with its channel facing inward, or, in other words, the ring is of internal channel form. This ring is preferably set in the hub during the forming thereof so it is firmly and rigidly secured therein and is substantially integral with the hub body.

When the hub, with the insert ring 7, has been formed, the portion thereof forming the side wall of the socket 5 is transversely drilled to provide spoke-receiving openings 8 to suit the number and position of the inner ends of the wire spoke members 3, with the ends thereof extending through the ring 7 and into its channel. In attaching the inner spoke ends to the hub, the wire or wires, or rod-like member or members 3 thereof, are inserted in respective openings 8 and then electrically welded, upset or otherwise firmly and rigidly anchored to the ring 7 within its channel, so that any burr formed on the spoke end by the welding or other upsetting will not interfere with the insertion of control parts or other mounting into the socket 5.

It is apparent that the invention not only provides a steering wheel hub of integral construction but also provides simple, strong and durable means for attaching the inner ends of the spoke members to the hub. Furthermore, the ring 7, in addition to serving as a rigid anchoring means for the spoke ends to which they may be welded, serves as a reinforcement for the hub.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. The method of making and assembling the hub and spokes of a steering wheel, consisting in die casting the hub in a single piece with a control-mount receiving socket in its outer end and during the die casting operation imbedding a steel ring in the side wall of the socket, then drilling said side wall and the ring to provide spoke-receiving openings extending outwardly from the socket, and then inserting the inner ends of wire spoke members into said openings and electrically welding their ends to said ring.

2. The method of making and assembling the hub and spokes of a steering wheel, consisting in die casting the hub in a single piece with a control-mount receiving socket at its outer end and during the die casting operation imbedding an internally channeled steel ring in the side wall of the socket with the ring channel opening into the socket, then drilling said side wall and ring to provide spoke-receiving openings therein extending outwardly from the socket, then inserting the inner ends of wire spoke members into said openings and electrically welding their ends to said ring within its channel.

JOHN W. ANDERSON.